United States Patent [19]

Anderson

[11] 4,026,493

[45] May 31, 1977

[54] HYDRAULIC DRIVE FOR FISHING REEL HAVING VARIABLE TAKEUP RATIO

[76] Inventor: William C. Anderson, 204 Forest Ave., Anderson, S.C. 29621

[22] Filed: July 16, 1976

[21] Appl. No.: 705,786

[52] U.S. Cl. .......................... 242/84.1 R; 188/293; 242/84.21 R; 242/84.5 R; 242/99
[51] Int. Cl.² .................. A01K 89/02; A01K 89/01
[58] Field of Search ................ 242/84.1 R, 84.1 A, 242/84.51 A, 84.5 R, 84.5 A, 84.51 R, 211, 212, 217, 218, 219, 220, 99; 188/293; 74/631

[56] References Cited

UNITED STATES PATENTS

| | | | |
|---|---|---|---|
| 2,918,227 | 12/1959 | Mauborgne | 242/84.21 R |
| 3,034,604 | 5/1962 | Holmes | 188/293 |
| 3,255,981 | 6/1966 | Wood, Jr. | 242/84.5 A |

FOREIGN PATENTS OR APPLICATIONS 750,587  6/1956  United Kingdom ........ 242/84.52 R Primary Examiner—Billy S. Taylor
Attorney, Agent, or Firm—Bailey, Dority & Flint

[57] ABSTRACT

A hydraulic drive is provided for a fishing reel including a drive hydraulic pump having a drive pump member driven by a manually rotatable handle and a driven hydraulic pump having a driven pump member connected to a winding means for causing the fishing line to be wound upon a spool carried by the frame of the fishing reel. A conduit connects the drive pump and the driven pump whereby rotation of the handle forces fluid from the drive pump to the driven pump for actuating the driven pump member and driving the winding means. A flow control valve is connected in the conduit for controlling the flow rate of fluid delivered to the driven pump so that the speed of rotation of the winding means can be varied for a constant input drive speed of the drive pump.

14 Claims, 3 Drawing Figures

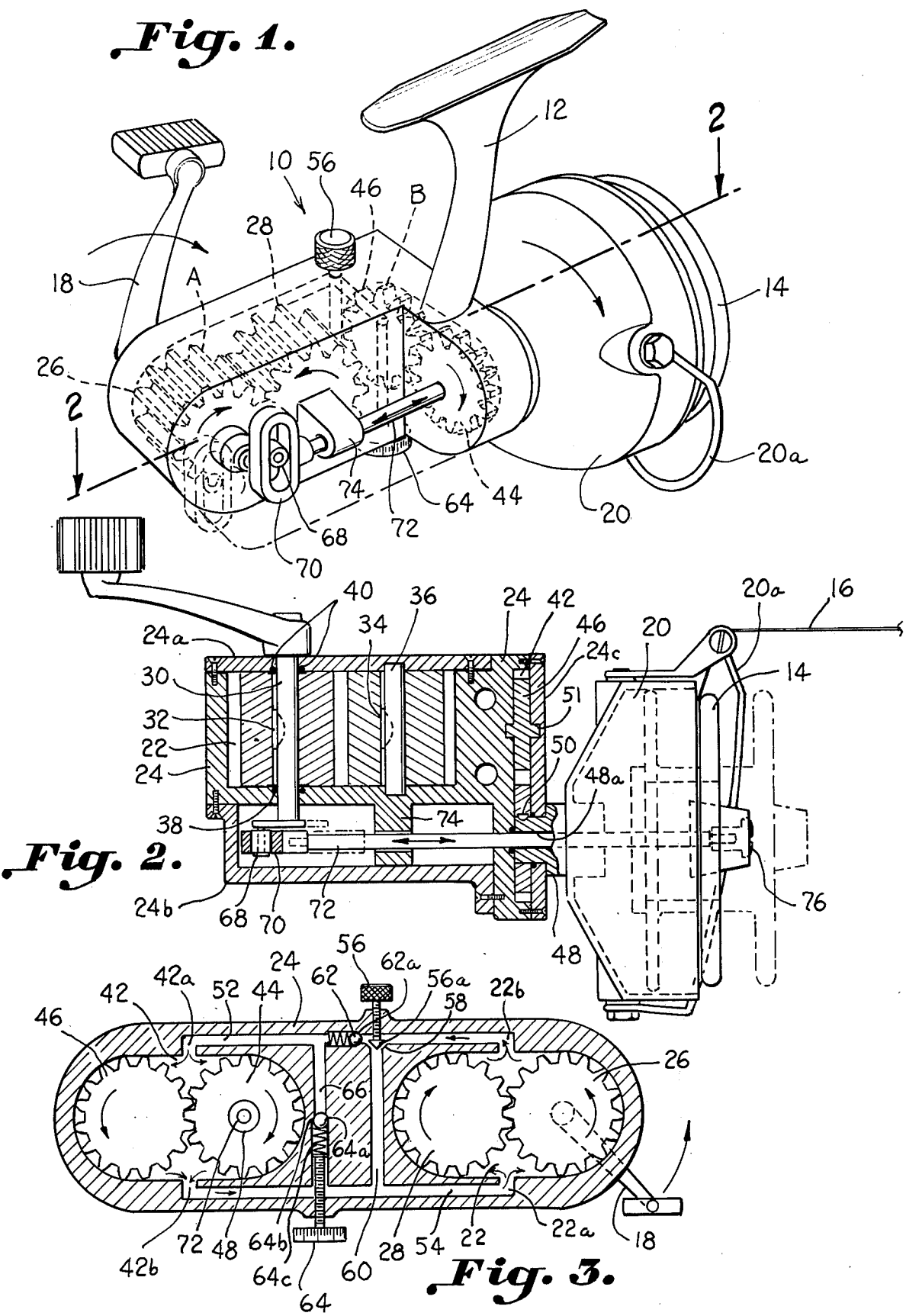

HYDRAULIC DRIVE FOR FISHING REEL HAVING VARIABLE TAKEUP RATIO

BACKGROUND OF THE INVENTION

Conventional fishing reels are generally of two types. The "free spool" type has the fishing line wound upon a spool which rotates freely and which is driven by a gear arrangement connected between the handle of the fishing reel and the spool. A retarding drag or braking must be applied to the line spool as the line is thrown outward to reduce the momentum of the spool and prevent backlash of line as it unwinds from the spool. The "spinning" type fishing reel generally includes a spool which is fixed in a frame of the fishing reel and around which a pickup drum rotates for winding the fishing line on the spool. A gear arrangement is connected between the handle and the rotating pickup drum for rotating the drum as the handle is manually rotated.

In both types of conventional dishing reels, the speed at which line can be taken up or wound upon the spool is limited by the particular gear arrangement connected between the handle and line winding means. Normally, a large drive gear is connected to the handle which meshes with a smaller driven gear connected to the line winding means. As the very large gear rotates one time the smaller driven gear will rotate a number of times, such as three or four. Thus, the takeup ratio or gear ratio of the reel is about three or four to one. The takeup ratio is limited to the size of gear that can be utilized as a drive gear without enlarging the size and weight of the fishing reel beyond impractical limits.

In addition, the particular takeup ratio that is desirable for a particular fishing reel depends upon the purposes and applications for which the reel is used. Some types of fishing require a very fast retrieve or taking up of the fishing line such as artificial bait casting, while other types of fishing may require much slower retrieval speeds and hence a smaller gear or takeup ratio.

Prior fishing reels have been proposed which utilize a mechanical gear drive arrangement for providing a variable takeup ratio. However, such arrangements have included a very large number of gears producing rather complicated and sophisticated mechanisms resulting in an unwieldy, costly and impractical device.

Canadian Patent No. 717,384 discloses a fishing reel which utilizes hydraulics in the braking mechanism to provide an adjustable retarding drag mechanism to the line spool. However, the device utilizes a conventional mechanical arrangement for winding line upon the spool.

SUMMARY OF THE INVENTION

A fishing reel is provided having a frame for attachment to an associated fishing rod, a spool filled with fishing line carried on the frame, and a handle means rotatably carried by the frame. A winding means is carried by the frame for winding the fishing line upon the spool when actuated. A drive means is connected between the handle means and the winding means for actuating the winding means.

The drive means comprises a first hydraulic pump means including a first pump chamber defined by a pump housing having an inlet and an outlet port, and a drive pump member enclosed within the chamber. An input shaft extends through the housing and is connected to the drive pump member. A remote end of the input shaft is connected to the handle means. A second hydraulic pump means includes a second pump chamber defined by a pump housing having an inlet and outlet port, and a driven pump member enclosed within the chamber. An output shaft is connected to the driven pump member having a remote end thereof extending through the housing with the winding means being carried adjacent the remote end for rotation with the output shaft. A first conduit means connects the first chamber outlet port and the second chamber inlet port and second conduit means connects the second chamber outlet port and the first chamber inlet port.

The first and second conduit means defines a closed hydraulic circuit together with the pump chambers having a suitable hydraulic fluid contained therein. The drive pump is actuated by rotation of the handle means to force fluid through the conduit means from the first chamber to the second chamber to actuate the driven pump member therein rotating the output shaft and the winding means. An adjustable flow control means is connected in the closed hydraulic circuit for controlling the flow rate of fluid delivered to the driven pump member in the second pump chamber to control the speed of rotation of the output shaft. In this manner the rate at which the line is wound upon the spool can be varied for a constant drive speed of the drive pump member.

Accordingly, an important object of the present invention is to provide a versatile fishing reel having a hydraulic drive and brake wherein the take-up or gear ratio of the line winding means may be varied by manual adjustment.

Another important object of the present invention is to provide a fishing reel having a hydraulic drive and brake which has a very high take-up gear ratio and fast retrieval of the fishing line.

Another important object of the present invention is to provide a fishing reel having a hydraulic drive and brake which include a minimum of moving parts enclosed in a hydraulic circuit and less susceptible to deterioration and wear.

Still another important object of the present invention is to provide a fishing reel having a hydraulically operated drive and brake which provides a very smooth wind-up action between the rotation of the handle means and the rotation of the line winding means.

Yet another important object of the present invention is to provide a fishing reel having a hydraulic drive and brake wherein the break may be conveniently manually adjusted to control the tension on the line for preventing the breakage thereof.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a perspective view illustrating a fishing reel having a hydraulic drive and brake as constructed in accordance with the present invention.

FIG. 2 is a top plan view taken along section line 2—2 of FIG. 1, and

FIG. 3 is a schematic view illustrating the hydraulic circuit of the hydraulic drive and brake as constructed in accordance with present invention.

DESCRIPTION OF A PREFERRED EMBODIMENT

The drive and brake apparatus of the present invention may be utilized with any of the conventional type fishing reels either of the "free spool" type or the "spinning" type which includes open and closed face spinning reels. Since such fishing reels are well known in the art, it will be unnecessary to disclose or describe all of the elements of a conventional fishing reel in detail. Moreover, since the application of the present invention is the same with any of the conventional types, it will be unnecessary to illustrate all of them herein, and have accordingly chosen to illustrate the invention in connection with the "spinning" fishing reel of the open face type, though without necessary or implied limitation thereto.

Accordingly, only those parts of the fishing reel which deviate from the conventional construction are shown in detail.

Referring now in more detail to the drawing a fishing reel, designated generally at 10, is illustrated having a frame 12 for attachment to an associated fishing rod (not shown). A spool 14 filled with fishing line 16 is ccarried by the frame. A handle 18 is rotatably carried by the frame. A rotatable pickup drum 20 provides a winding means for winding the line 16 upon the spool 14 when actuated.

A drive means including a first hydraulic pump means A and a second hydraulic pump means B is connected between handle means 18 and the winding means 20 for actuating the winding means as the handle is manually rotated.

The first hydraulic pump means A acts as a drive pump and includes a first pump chamber 22 defined by a pump housing 24 having an inlet port 22a and an outlet port 22b. A drive pump member includes a pair of meshing gear elements 26 and 28 enclosed within the pump chamber 22 to form a gear pump assembly. An input shaft 30 extends through the housing 24 and is connected to the gear element 26 of the drive pump member. A remote end of the input shaft 30 is connected to the handle means 18. Thus, as the handle 18 is rotated so will be the input shaft 30 and the gear element 26 which is affixed to the input shaft 30 such as by key 32. The gear element 28 is keyed at 34 to an idler shaft 36. As the gears 26 and 28 rotate in opposite directions and mesh at a point in the chamber between the inlet and outlet ports, a partial vacuum is formed as the teeth of the two gears separate which draws fluid through the inlet port 22a into the pump chamber 22. Fluid in the chamber is then trapped between the two gears and the housing so that it is carried through two separate paths around to the outlet port 22b. As the teeth again mesh they produce a force which drives the liquid through the outlet port.

Numerous variations are possible in the arrangement of the gears, however, in the preferred embodiment gear elements 26 and 28 are one inch in diameter and one inch wide.

The pump housing 24 is provided with suitable sealing means 38 and 40 to prevent against leakage of the hydraulic fluid from within the housing at the points where the input shaft 30 makes its entrance and exit. The pump housing 24 includes removable side plates 24a, 24b, and 24c which are affixed to the core 24 in any suitable manner such as the illustrated screws.

The second hydraulic pump means B acts as a driven pump and includes a second pump chamber 42 defined by the pump housing 24 having an inlet port 42a and an outlet port 42b. A driven pump member includes a pair of meshing gear elements 44 and 46 enclosed within the chamber 42 which forms a second gear pump assembly.

An output shaft 48 is keyed at 50 to the gear element 44 to rotate therewith. A remote end of the output shaft extends through the housing 24 with the pickup drum winding means 20 fixedly carried adjacent the remote end thereof for rotation with the output shaft. The gear element 46 is affixed to idler shaft 51 which is rotatably journaled in the housing 24.

A first conduit means 52 connects the first chamber outlet port 22 and the second chamber inlet port 42a. A second conduit means 54 connects the second chamber outlet port 42b and the first chamber inlet port 22a. The first and second conduit means 52 and 54 define a closed hydraulic circuit together with the first and second pump chambers 22 and 42 having a suitable hydraulic fluid contained therein. As the drive pump member is actuated by rotation of the handle means 18 the fluid is forced through the conduit means 52 from the first chamber 22 to the second chamber 42 to actuate the driven pump member in chamber 42 causing the output shaft 48 to rotate as well as the winding means 20 affixed thereto. The operational pressures of the fluid in the hydraulic circuit will normally be in the range of 20 psi. As the drum winding means 20 is rotated in a clockwise direction, the pickup bail 20a picks up the fishing line 16 and winds the line about the spool 14. The bail 20a pivots out of pick-up position to permit free casting of the line from spool 14 in a conventional manner. The bail 20a returns to the line pick-up position upon rotation of handle 18 by retraction of a hold down latch (not shown) which also is a conventional operation.

An adjustable by-pass valve 56 is threadably received in the housing 24 and includes a valve member 56a and a cooperating valve seat 58. The by-pass valve 56 is connected in the first conduit means 52 and by-passes a desired amount of fluid through a return channel 60 to the pump chamber 22 by way of second conduit means 54 by-passing the second pump means B. The by-pass valve 56 provides a flow control means in the closed hydraulic circuit for controlling the flow rate and volume of fluid delivered to the driven pump means B for controlling the speed of rotation of the output shaft 48. For a given or constant drive speed of the drive pump means A by handle 18, the rotational speed of driven pump means B and winding means 20 can be varied by manual adjustment of valve 56.

As fluid is pumped from the pump means A through conduit 52 to the inlet 42a of the pump means B, the fluid enters chamber 42 and provides a force which drives the gear elements 46 and 44 in opposite directions with the fluid leaving the chamber 42 by way of the outlet 42b to be returned by conduit 54 to the inlet 25a of the drive pump member.

Thus, the valve 56 regulates the flow to the driven pump means B by diverting an adjustable portion of pump flow delivered from the drive pump means A. Since the gear pump is a fixed displacement pump and the rotation speed of the outport shaft 48 is determined by the displacement and the amount of fluid available to the driven pump means B, speed control of the output shaft can be accomplished by controlling the setting of the valve 56 and hence the flow of fluid to it. This is true for a given rotational speed of the input shaft 30 by manual rotation of the handle 18. It is to be understood, of course, that other suitable control valves may be utilized for varying the output speed of the pump means B, and that other suitable types of positive displacement pumps may also be utilized.

A check valve member 62 is provided in the form of a spring loaded ball having a valve seat 62a. The check valve 62 is located in the conduit 52 on the downstream side of the adjustable valve 56 for preventing a reverse flow of fluid through the flow control valve 56. Reverse flow occurs when the line winding drum 20 is rotated in a reverse or counterclockwise direction due to the line being stripped off of the spool 14 under the tension load of a running fish. Since flow is prevented from reverse flow in the conduit 52, the fluid being pumped in a reverse direction out of the inlet port 42a will be increasingly pressurized. In this manner the check valve 62 provides a hydraulic brake retarding the reverse rotation of winding means 20 as pressure builds up.

To prevent the fishing line 16 from breaking when the pressure exceeds the test weight of the line, the hydraulic brake includes an adjustable pressure relief valve 64. The relief valve 64 provides a pressure relief means carried in parallel with the check valve 62 venting excess pressure built up above a predetermined point due to the reverse rotation of the winding drum means 20. The point at which excess pressure is vented is determined by turning valve thumb screw 64 to adjust the biasing force of spring 64c.

When the pressure builds up above the tensile strength of the fishing line test weight, the ball valve 64a will unseat from its valve seat 64b to vent the pressure through the parallel channel 66 and the conduit 54 so as to prevent the fishing line from breaking. For example, with the relief valve 64 properly set at a pressure of ten pounds, and with utilizing a ten pound test fishing line, the pressurization due to the reverse rotation of the gear pump means B will unseat the valve element 64a prior to the tension on the fishing line exceeding the 10 pound limit. Of course, the relief valve 64 may be set to relieve pressure and hence drag prior to the 10 pound limit being reached. Therefore, it can be seen that the valve 64 provides an adjustable drag or brake which retards the rotation of the pickup drum 20 under rotation due to the running of a fish.

The fishing reel includes means for reciprocating the spool 14 causing the line to be wound on the spool in a level manner as the pickup drum 20 winds the line around the spool. The reciprocating means includes an eccentric assembly having a bell crank 68 connected to a distal end of the input shaft 30. The end of the bell crank 68 is slideably received in a slotted collar 70 which is affixed at one end to a reciprocating shaft 72. The reciprocating shaft 72 is slideably journaled within a bearing block 74 carried by the fishing reel frame.

The distal end of the shaft 72 extends through the center of gear element 44 and through a hollow opening 48a in the output shaft 48. The spool 14 is then affixed to the end of the shaft 72 by any suitable means such as an internally threaded thumb screw 76 affixed over a threaded end of the shaft 72.

As in the input shaft 30 is rotated, the bell crank 68 will rotate and slide within the slot of the collar 70 to reciprocate the shaft 72 and hence the spool 14 carried on the end thereof between the dotted line positions as shown. In this manner the line is wound upon itself in a level on the spool 14 while the pickup drum 20 is simultaneously rotated about the spool to deposit the line thereon. The pump chamber 42 is provided with suitable seal means to allow for the extension of shaft 72 therethrough as well as the output shaft 48.

As mentioned heretofore, numerous gear arrangements and ratios are possible for the drive pump A and the driven pump B. In the preferred embodiment, the gear elements 26 and 28 are one inch in diameter and one inch in width, and the gear elements 44 and 46 are one-eight inch in diameter and one-eighth of an inch in width. This provides a takeup or gear ratio of eight to one, that is, the gear elements of the driven gear pump B will rotate eight times for one revolution of the gear elements of the drive pump A. This provides an extremely fast takeup speed for the fishing line during retrieval operations. However, when such a fast retrieve is not necessary and a slower retrieve is desired for the same rotational speed of handle 18, the adjustable by-pass valve 56 may be opened to the necessary amount in order to obtain the desired takeup speed of the line on the spool 14. The takeup ratio may be varied in this manner anywhere from a maximum of eight to one downwardly to a minimum value of approximately one to one.

Thus, it can be seen that an advantageous construction can be had for a variable speed takeup drive apparatus for a fishing reel in accordance with the present invention. The variable speed takeup ratio is provided by an advantageous gear arrangement including a drive gear member and a separate driven gear member wherein the amount of fluid may be varied which is delivered to the driven pump member. The hydraulic drive arrangement also provides for an effective hydraulic brake which retards the rotation of the line winding means when rotated in a reverse direction under the load of a running fish. The brake may be adjusted so as to not break the fishing line by utilization of an adjustable pop-off relief valve.

While a preferred embodiment of the invention has been described using specific terms, such description is for illustrative purposes only, and it is to be understood that changes and variations may be made without departing from the spirit and scope of the following claims.

What is claimed is:

1. In a fishing reel having a frame for attachment to an associated fishing rod, a spool filled with fishing line carried on said frame, handle means rotatably carried by said frame, winding means carried by said frame for winding said fishing line upon said spool when actuated, drive means connected between said handle means and said winding means for actuating said winding means, said drive means comprising:
   a. a first hydraulic pump means including a first pump chamber defined by a pump housing having an inlet and an outlet port, said first pump means including a drive pump member enclosed within said chamber;
   b. an input shaft extending through said housing connected to said drive pump member, a remote end of said input shaft being connected to said handle means;
   c. a second hydraulic pump means including a second pump chamber defined by a pump housing having an inlet and outlet port, and a driven pump member enclosed within said chamber;

d. an output shaft connected to said driven pump member having a remote end thereof extending through said housing, said winding means being carried adjacent said remote end for rotation with said output shaft;

e. first conduit means connecting said first chamber outlet port and said second chamber inlet port and second conduit means connecting said second housing outlet port and said first housing inlet port;

f. said first and second conduit means defining a closed hydraulic circuit together with said pump chambers having a fluid contained therein;

g. said drive pump member being actuated by rotation of said handle means to force fluid through said conduit means from said first chamber to said second chamber to actuate said driven pump member therein rotating said output shaft and said winding means; and h. flow control means connected in said closed hydraulic circuit for controlling the flow rate of fluid delivered to said driven pump member in said second pump chamber to control the speed of rotation of said output shaft;

whereby the rate at which said line is wound upon said spool can be varied for a constant drive speed of said drive pump member.

2. The apparatus of claim 1 wherein said drive pump member includes a gear pump member having a pair of meshing gear elements, one of said gear elements being connected to said input shaft.

3. The apparatus of claim 2 wherein said driven pump member includes a pump member having a pair of meshing gear elements, one of said gear elements being connected to said output drive shaft.

4. The apparatus of claim 1 wherein said flow control means includes a variable by-pass valve connected in said first conduit means for delivering a portion of said fluid to said second conduit means by-passing said second pump means.

5. The apparatus of claim 1 further comprising check valve means located on the downstream side of flow control means preventing a reverse flow of fluid through said flow control means.

6. The apparatus of claim 1 further comprising hydraulic brake means for retarding the reverse rotation of said winding means due to line unwinding from said spool under the tension pull of a running fish.

7. The apparatus of claim 1 wherein the takeup ratio of the rotational drive speed of said driven pump member to said drive pump member is variable downwardly from a maximum of 8:1.

8. The apparatus of claim 3 wherein said gear elements of said driven pump members have a gear ratio to said gear elements of said drive pump member of eight to one.

9. The apparatus of claim 1 further comprising reciprocating means carried by said frame for causing said line to be wound on said spool in a level manner, said reciprocating means including an eccentric assembly connected to said drive pump member, an elongated shaft member connected to said eccentric assembly so as to reciprocate as said drive pump member is actuated, and said spool being affixed to a distal end of said shaft for reciprocation therewith to cause said line to be wound thereon in said level manner as said winding means rotates.

10. The apparatus of claim 9 wherein said elongated shaft extends through said driven pump member and co-axially through said output shaft.

11. The apparatus of claim 1 wherein said winding means includes a pickup drum affixed to said remote end of said output shaft having means for picking up said line and causing said line to be wound upon said spool as said drum rotates.

12. The apparatus of claim 6 wherein said brake means includes a check valve means connected in said conduit preventing the passage of fluid through said flow control means in a reverse direction and a pressure relief means in a parallel flow relation to said check valve means for relieving pressure built up due to said checking of said reverse flow when said pressure exceeds a predetermined level.

13. In a fishing reel having a frame for attachment to an associated fishing rod, a spool filled with fishing line carried on said frame, handle means rotatably carried by said frame, winding means carried by said frame for causing said fishing line to wind upon said spool when actuated, drive means connected between said handle means and said winding means for driving said winding means, said drive means comprising:

a. a first hydraulic pump means carried by said frame having a drive pump member connected to said handle means;

b. a second hydraulic pump means carried by said frame having a driven pump member;

c. connecting means connecting said driven pump member and said winding means causing said winding means to be driven as said driven pump member is actuated;

d. conduit means connecting said first and said second pump means to define a closed hydraulic circuit together with said pump means having a fluid contained therein;

e. said drive pump member actuated by rotation of said handle means to force said fluid through said conduit means to said second pump means for actuating said driven pump member and winding means so as to cause said line to wind upon said spool;

f. flow control means connected in said conduit means for controlling the flow of said fluid delivered to said second pump means so as to control the rate of rotation of said output shaft and said winding means;

whereby the rate at which the line is wound upon said spool can be varied for a given drive speed of said drive pump member.

14. The apparatus of claim 13 further comprising manually adjustable means for limiting the amount of pressure buildup in said second pump chamber due to reverse actuation of said driven pump member and winding means so as to limit said pressure and hence the tension on said fishing line when under load of a running fish.

* * * * *